Oct. 14, 1930.  E. E. WINKLEY  1,778,054
SORTING MACHINE
Filed Oct. 6, 1925  3 Sheets-Sheet 1

INVENTOR-
Erastus E. Winkley
By his Attorney,
Nelson W. Howard

Oct. 14, 1930.  E. E. WINKLEY  1,778,054
SORTING MACHINE
Filed Oct. 6, 1925    3 Sheets-Sheet 3
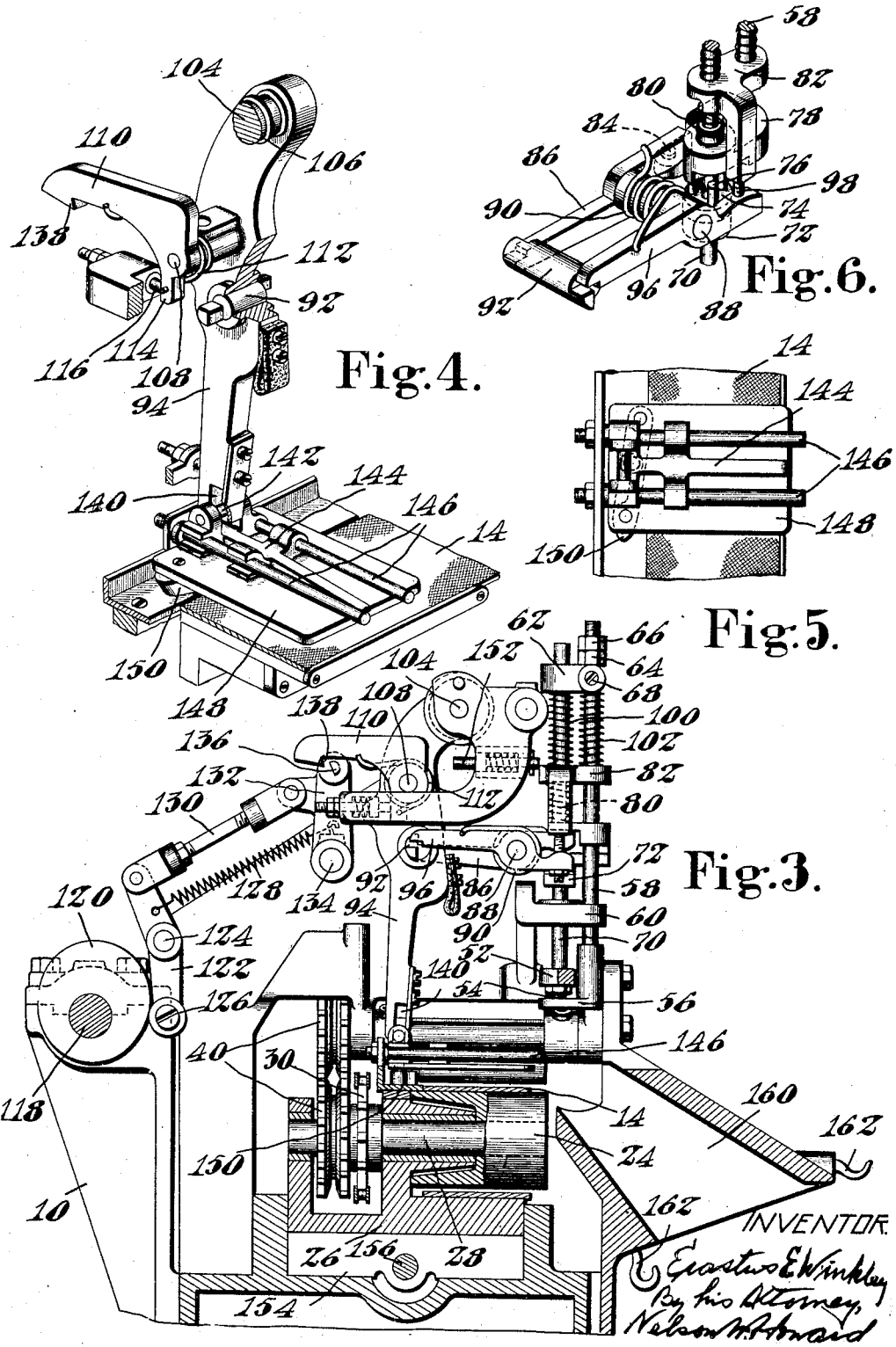

Patented Oct. 14, 1930

1,778,054

UNITED STATES PATENT OFFICE

ERASTUS E. WINKLEY, OF LYNN, MASSACHUSETTS, ASSIGNOR TO UNITED SHOE MACHINERY CORPORATION, OF PATERSON, NEW JERSEY, A CORPORATION OF NEW JERSEY

SORTING MACHINE

Application filed October 6, 1925. Serial No. 60,764.

This invention relates to machines for sorting articles in accordance with one of their dimensions and is herein illustrated as embodied in a machine for sorting heel lifts in accordance with their respective thicknesses.

It is customary in heel factories to sort heel lifts for thickness, in order to facilitate the subsequent evening, compressing or heel building operations in which the lifts are to be used. The general object of the present invention is to provide an improved machine for sorting of blanks, or other similar articles such, for example, as sole blanks or the like, which machine shall be capable of automatic operation at a high rate of speed and shall be accurate and dependable in operation.

A further object of the invention is to provide a machine of the character referred to which shall be flexible in respect to adjustment and operation and consequently adaptable to the more efficient handling of a wide range of work than are the sorting machines of the prior art.

The illustrative machine herein shown comprises a conveyor upon which the articles to be sorted may be deposited in rapid succession and which carries the articles through a series of distributing stations, one for each thickness determined by the system of grading in accordance with which the blanks are to be sorted. Ejecting mechanism is provided, operating definitely and accurately to remove each blank from the carrier and discharge it into a suitable receptacle at the station assigned to receive blanks of that particular thickness.

In order to insure accurate and rapid distribution of the blanks from the carrier, the ejecting mechanism in the illustrated machine comprises a series of strikers, one for each station, which are selectively operated by mechanism controlled by detectors which are engaged by the blanks, the strikers being operated so quickly that it is not even necessary to interrupt the movement of the carrier while a blank is being removed therefrom at the proper station for the delivery of that blank.

Improved features of the detector mechanism make the machine easily and quickly adaptable to the sorting of articles of a wide range of thickness and to sorting in accordance with any required fineness or coarseness of gradation. In the illustrated embodiment of the invention a single means is provided for altering the settings of all the detectors, for operation upon blanks of different ranges of thickness, preferably without altering the gradation between the successive detectors, and further provision is also made for altering the settings of individual detectors, to adjust their gradation to meet the requirements for the work at hand.

While the accompanying drawings illustrate in detail one successful practical embodiment of the invention, including certain specific details of construction and combinations of parts, it should be understood that various changes and adaptations may be made without departing from the spirit of the invention, the scope of which is defined in the appended claims.

In the drawings,

Fig. 3 is a view partly in elevation and partly in cross section through one of the delivery mechanisms;

Fig. 4 is a perspective view of one of the strikers and its actuating means;

Fig. 5 is a plan view of one of the strikers; and

Fig. 6 is a perspective view of a part of the striker controlling mechanism.

Figure 1:
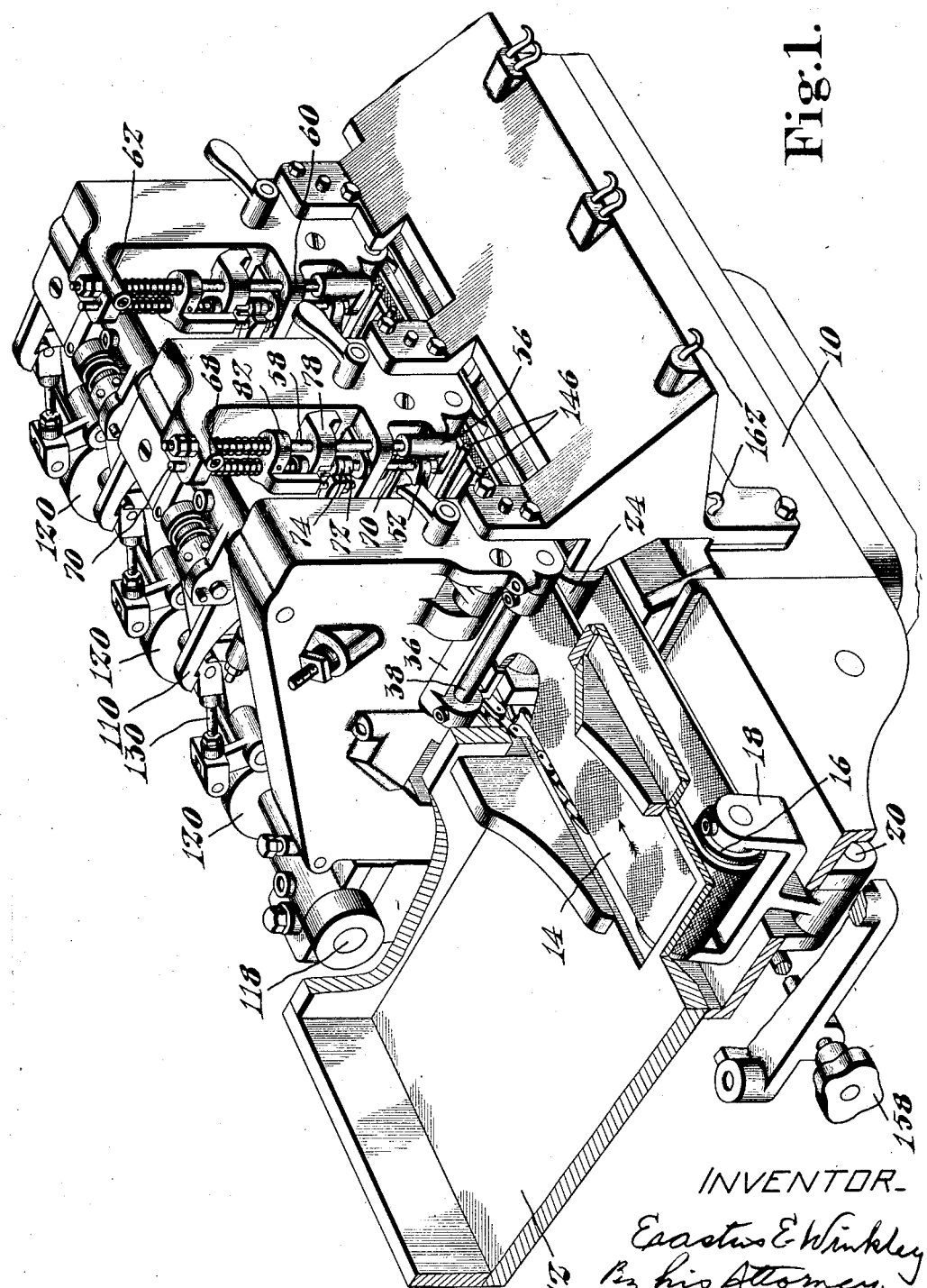
Fig. 1 is a perspective view, with certain parts broken away, illustrating features of a sorting machine embodying the invention.

A series of thickness detectors at least equal in number to the number of grades in which the thicknesses are to be sorted is arranged in a line on which the blanks or articles are fed. Inasmuch as the detectors and their associated mechanisms in the series are identical and may be varied in number according to the range of work which the machine is designed to handle there are illustrated in Fig. 1 only the first two thickness detecting and blank discharging units, it being understood that the arrangement shown may be continued to any extent desired.

Figure 2:
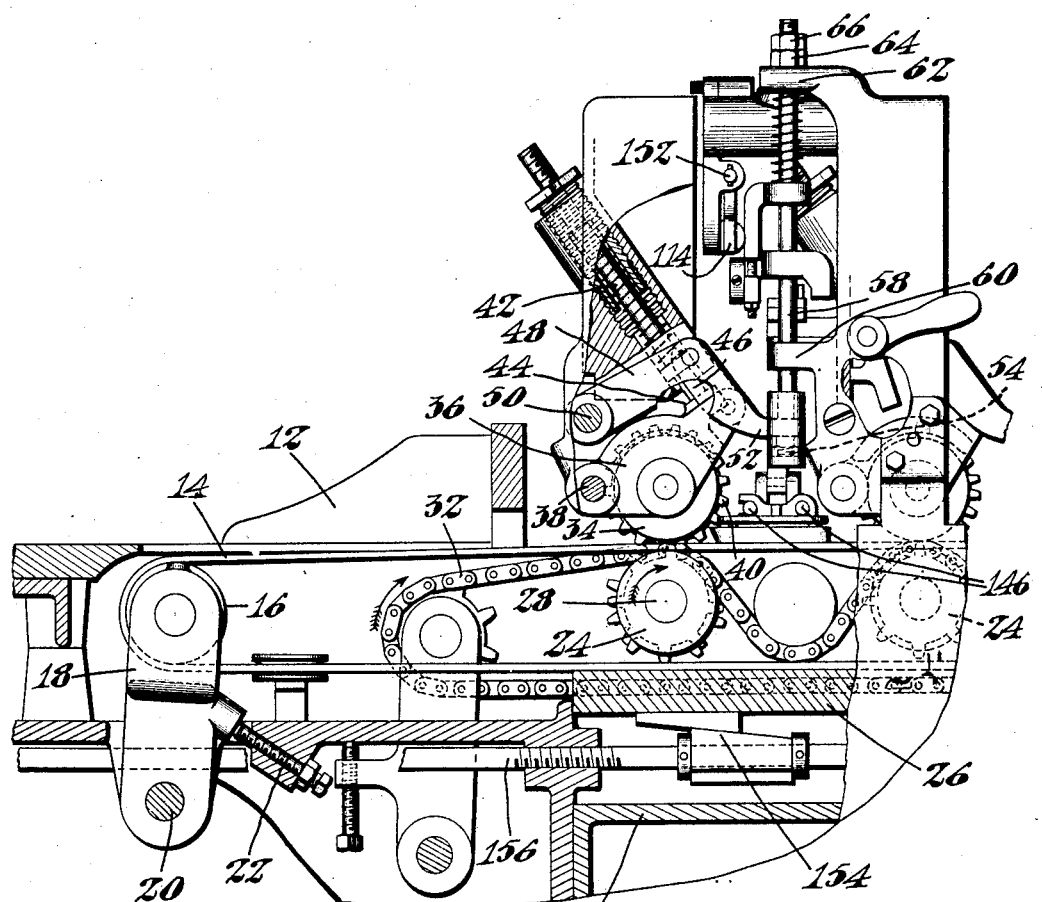
Fig. 2 is a longitudinal, sectional view of parts of the mechanism shown in Fig. 1.

The operating mechanism of the machine is mounted and supported upon a stationary base or frame 10 which may be placed upon a bench or may be provided with legs for supporting it upon the floor as desired. A table or bin 12 is arranged to receive and hold a supply of unsorted articles or blanks to be operated upon by the machine. The said articles are placed one at a time by the operator on a conveyor 14 consisting of an endless belt which is continually driven in the direction indicated by the arrow in Fig. 1 as long as the machine is in operation. As shown in Figs. 1 and 2 the conveyor 14 passes around an idle roll 16 journaled in a yoke 18 which is pivoted at 20 to the machine frame. A screw 22 bearing against the yoke 18 provides for adjusting the conveyor belt so that it may be kept properly taut at all times. At the other end of its path the belt may be engaged by any suitable form of driving mechanism, not shown.

In its path of movement the conveyor belt passes over a series of rolls 24 each of which is the lower roll of a pair constituting a thickness measuring device or detector. As already stated, the thickness detecting mechanisms are all alike and therefore only one of them will be described in detail. The rolls 24 are all journaled in a carrier 26 as shown most clearly in Fig. 3, the shaft 28 of each roll having secured to it a sprocket 30. These sprockets are all connected together by a chain 32 by which they and the rolls associated with them are driven.

Co-operating with each roll 24 is an upper roll 34 journaled in a yoke 36 which is movable to a limited extent about a stationary pivot 38. The rolls 24 and 34 are geared together by gearing 40 and rotate at the same surface speed. A spring pressed plunger 42 which bears upon the yoke 36, as shown at 44 in Fig. 2, tends to depress the yoke and the roll 34 carried thereby toward the lower roll 24. The movable end of the yoke 36 is connected by a link 46 to a lever 48 which is movable about a stationary pivot 50. The lever 48 is provided with an extension 52 in which is an adjustable screw 54 (see Figs. 2 and 3).

The screw 54 engages an angular stop 56 secured to the lower end of a vertical rod 58 which is freely slidable in bearings formed in stationary brackets 60, 62. The upper end of the rod 58 is threaded and provided with an adjusting nut 64 and a lock nut 66. It will now be understood that the stop 56 has for its purpose to limit adjustably the downward movement of the upper measuring roll 34 and consequently its approach to the lower roll 24. The vertical adjustment of the stop 56 is controlled by the adjusting nut 64 which is locked in adjusted position by the lock nut 66, and the rod 58 may be readily secured in adjusted position by a set screw 68 which is threaded into the bracket 62 and arranged to engage the said rod.

When a heel lift or other article to be sorted, which is of sufficient thickness, is carried by the conveyor 14 between the rolls 24, 34, the upper roll 34 will be lifted and, through the connections already described, will cause the lever extension 52 to be raised. Resting loosely upon the said lever extension is the lower end of a rod 70 which is also arranged for vertical sliding movement in bearings formed in the stationary brackets 60, 62. The rod 70 has secured to it a collar 72 (Figs. 1, 3, 6) upon which rests loosely a pin disk 74 in which are inserted a plurality of upright pins 76 of different lengths. The pin disk may be turned manually so that one or another of the pins 76 will engage the underside of a latch-controlling member 78 (Figs. 1 and 6) which is arranged to slide vertically upon the two rods 58, 70 and which is under the depressing influence of a compression spring 80 bearing against the under side of a latch-controlling dog 82 which is secured to the rod 70 and which slides vertically upon the rod 58.

The latch-controlling member 78 has an adjustable screw 84 which bears against the under side of one end of a latch 86 movable about a stationary pivot 88 against the influence of a spring 90 in a counterclockwise direction as viewed in Figs. 3 and 6. The nose of the latch 86 normally engages and restrains from movement a pin 92 secured in a swinging arm 94 the function of which will be described later.

A second latch 96, also movable about the pivot 88, is under the influence of the spring 90 acting in a direction opposite to that in which it acts upon the latch 86. The nose of the latch 96 is somewhat shorter than that of the latch 86 and is arranged to be engaged by the pin 92 after the latter is released by the latch 86. The tail end of the latch 96 has an adjustable screw 98 which engages the under side of the latch-controlling dog 82 which, as heretofore described, is secured to the rod 70. Compression springs 100, 102, surrounding the rods 70 and 58 respectively, bear against the under side of the bracket 62 and the upper face of the dog 82, tending to depress the dog and the rod 70 to which it is secured. Briefly stated, the rise of the rod 70 causes the disengagement of the latch 86 from the pin 92, permitting the arm 94 to swing forward slightly until the pin 92 engages the latch 96, and the subsequent descent of the rod 70 then causes the disengagement of the latch 96 from the pin 92, freeing the arm 94 and permitting it to perform its function which is that of discharging a blank from the conveyor belt.

Each arm 94 is mounted to swing in a vertical plane about a stationary pivot 104 the axis of which is parallel to the path of the conveyor belt. The plane in which the arm 94 swings is adjacent to and immediately beyond the detector unit by which the said arm is controlled. A torsion spring 106 (Fig. 4) surrounds the pivot 104 and tends to swing the arm 94 toward the front of the machine, that is to say in a counterclockwise direction as viewed in Fig. 3. Pivoted to the arm 94 at 108 is a catch 110 (Figs. 1, 3, 4) which a torsion spring 112 tends to lift. The catch has a downwardly extending lug 114 arranged to strike against an adjustable spring pressed sliding bar 116 mounted in a stationary part of the machine frame.

A power driven eccentric shaft 118 extends along the back of the machine and carries a plurality of eccentrics 120, one for each of the swinging arms 94. In co-operative relation to each eccentric there is a lever 122 movable about a stationary pivot 124 and carrying at one end a roll 126 adapted to engage the eccentric 120. A spring 128 keeps the roll 126 in engagement with the eccentric and the other end of the lever 122 is connected by an adjustable link 130 to a rocker arm 132 arranged to oscillate about a stationary shaft 134 and having at its upper end a pin 136 adapted to engage the hook 138 of the catch 110. The eccentric shaft 118 is timed to make a plurality of revolutions during the time required for a given point on the conveyor belt 14 to move from one pair of thickness measuring rolls 24, 34 to the next pair of such rolls.

The purpose of the mechanism last described is to reset the swinging striker arm 94 after it has been actuated to discharge a blank from the conveyor. The lower end of the striker arm is so formed as to provide a notch 140 to receive a pin 142 secured in a slide 144 which is horizontally movable transversely of the conveyor belt 14 upon a pair of stationary guide-bars 146. The slide 144 has secured to it a plate 148 to which is attached a striker 150 adapted to engage an article on the belt 14 beneath the plate 148 and discharge the article horizontally from the belt.

When the striker arm 94 is released by the latches 86 and 96, the arm is snapped suddenly forward by the spring 106, causing the striker 150 to engage and discharge from the belt the article which is in its path. As the arm 94 swings forward the lug 114 moves away from the bar 116, permitting the spring 112 to raise the catch 110 sufficiently to allow the hook 138 to pass above the pin 136. As the striker arm approaches the limit of its forward movement, the front face of the upper portion of the catch 110 engages a spring pressed pin 152 (Figs. 2, 3) which causes the hook 138 to be swung yieldingly against the tension of the spring 112 into a position to be engaged by the pin 136 upon the continually oscillating rocker arm 132. In the next rotation of the eccentric 120 the said rocker arm engages the hook 138 and resets the striker arm 94 to a position where it is again locked by the latches 86, 96, with the spring 106 under tension.

In adjusting the machine for operation the screws 84 of the successive units of the machine are so adjusted that each thickness detector will cause the release by the latch 86 of the pin 92 of the striker arm 94 controlled by said detector when there passes through that detector a blank which is slightly thinner than one to which the preceding detector of the series is responsive. In the event that heel lifts are being sorted for thickness the gradation, or differences in thickness of the blanks to which the successive units are responsive, may, for example, be one iron, viz. 1/48 inch. In the case of other kinds of articles or blanks adjustment for some different gradation may readily be made. The adjustment of the stop 56 is such that the upper measuring roll 34 controlled by it is permitted to descend far enough to be engaged and lifted by a blank of the thickness to which the detector of which that roll is a part is intended to respond. The adjustment of the screw 98 is such that when the roll 34 is not raised the latch 96 will be lifted sufficiently to be disengaged from the pin 92. The pin disks 74 are all alike and the successive pins in each disk differ in height from each other by like amounts, for example 1/8 inch. Normally the corresponding pin of each disk will be set in operative position to engage the members 78 and the pin disks afford a simple means for changing the adjustments through the machine by a fixed amount, such for example as 1/8 inch in the case given, without the necessity of using the greater care required in making the more tedious adjustments of the screws 84.

Further provision is made for adjusting simultaneously, in a single manual operation, the spacing between the measuring rolls of the whole series of the detectors. To this end the carrier 26, in which all the lower rolls 24 are mounted, is supported by adjustable wedges 154 operated by a screw 156 having a conveniently accessible knob 158 which may easily be turned manually to raise or lower the entire series of lower rolls 24.

The blanks are discharged horizontally from the conveyor belt into chutes 160 (Fig. 3) beneath which may be placed receptacles to receive the sorted blanks or bags for the reception of the blanks may be hung upon hooks 162 provided for the purpose.

To facilitate an understanding of the manner in which the machine functions a brief statement of its operation will now be given. The articles to be sorted, which in the present instance may be assumed to be heel blanks are placed upon the table 12 in a collection which is heterogeneous as to thickness and the operator merely places them one by one upon the exposed portion of the conveyor belt 14. If the first blank is thick enough to raise the upper roll 34 of the first detector sufficiently to release the latch 86 controlled by it that blank will be discharged into the first receptacle, as will also all succeeding blanks of equal or greater thickness. If, however, the thickness of a blank is insufficient to raise the first detector roll far enough to release the first striker that blank will not be discharged into the first receptacle but will be fed along by the conveyor until it reaches the detector which is responsive to its thickness.

When the upper detector roll is raised sufficiently by a blank to cause the release of the latch 86 controlled by that detector the striker arm 94 controlled by this latch is preliminarily released and swings forward slightly until it is stopped by engagement with the latch 96, which has been allowed to descend into the path of the pin 92 by the raising of the dog 82 upon the rod 70. The striker remains in this position until the blank has passed entirely through the detector whereupon the roll 34 descends, permitting the spring 100 to lower the rod 70 and the dog 82, thus releasing the latch 96 and allowing the completion of the forward movement of the striker to discharge the blank from the conveyor into the adjacent receptacle.

Inasmuch as the rocker arms 132 are operating continually at greater speed than the conveyor belt, the striker arm 94 will be immediately picked up and reset, in time to operate again upon the next blank if the said blank should be of a thickness to which the same detector is responsive.

The springs 106 are quite strong and the operation of the strikers which they actuate is so sudden that the blanks are discharged instantaneously from the conveyor without necessitating any pause in the conveyor movement. This is conducive to high speed in operation, inasmuch as the feeding of the articles to the sorting mechanisms is continuous and their delivery is instantaneous.

Having described the invention, what is claimed as new and desired to be secured by Letters Patent is:

1. A blank sorting machine comprising continuously movable means for supporting a blank, means for measuring a dimension of the blank, a striker movable to sweep the blank horizontally from the support, and mechanism controlled by the measuring means and responsive to the measured dimension for causing the striker to operate.

2. A blank sorting machine comprising continuously movable means for supporting a series of blanks, a plurality of thickness detecting devices spaced apart along the supporting means, each detecting device being responsive to a thicker blank than is the succeeding detecting device, a striker associated with each detecting device, and means dependent upon the thickness of each blank for determining through the action of the detecting device whether the striker shall operate.

3. In a blank sorting machine, the combination of a series of detecting devices responsive to blanks of different thicknesses, a corresponding series of spring operated strikers for discharging blanks into different receptacles, a conveyor belt arranged to feed blanks to the detecting devices, and means operated by any one of the detecting devices for releasing the corresponding striker when said detecting device is acted upon by a blank of a thickness to which it is responsive.

4. In a blank sorting machine, the combination of a series of pairs of rolls, the rolls of each pair being separated from each other by a distance less than that by which the preceding pair is separated, means for delivering a blank from one pair to another of the series until the blank is engaged by that pair the distance between which is set to respond to the thickness of the blank, and striking means operating then to engage the blank and discharge it horizontally from the series.

5. In a blank sorting machine, the combination of a series of thickness detecting mechanisms, each succeeding mechanism in the series being constructed and arranged to be responsive to a thinner blank than is the preceding mechanism, means for continuously feeding blanks from one mechanism to another of said series, and means controlled by the detecting mechanisms for suddenly removing a blank from the series, without interrupting the movement of the feeding means, when the blank passes that detecting mechanism which is responsive to its particular thickness.

6. In a blank sorting machine, the combination of means for moving a blank in a predetermined path, thickness detecting means in the path of movement of the blank, blank ejecting mechanism, means under the control of the detecting means for initiating the operation of said mechanism, and means also under the control of the detecting means for continuing the operation of said mechanism.

7. In a blank sorting machine, the combination of means for moving a blank in a predetermined path, thickness detaching means in the path of movement of the blank, blank ejecting mechanism, means for initiating the operation of said mechanism when a blank of a certain thickness engages the detecting means, and means for continuing the operation of said mechanism when said blank leaves the detecting means.

8. In a blank sorting machine, the combination of means for moving a blank in a predetermined path, thickness detecting means in the path of movement of the blank, spring operated blank discharging mechanism, two latches engaging said mechanism and restraining it from operation, and connections between the detecting means and the latches constructed and arranged to release one latch when a blank of a certain thickness engages the detecting means and to release the other latch when said blank leaves the detecting means.

9. In a machine of the class described, the combination of a series of thickness detectors each comprising a pair of co-operating gage rolls spaced apart a distance determined by the thickness of a blank to which it is desired that the detector shall respond, one roll of each pair being carried by an adjustable support common to all the detectors, the other roll of each pair being mounted for independent adjustment relatively to the co-operating roll of its pair, and means for adjusting said support, with all the rolls carried thereby, toward and from the independently adjustable rolls.

10. In a machine of the class described, the combination of a series of supporting rolls, a conveyor running over said rolls, a series of gage rolls one of which is carried in an upwardly yielding pivotal mounting above each of said supporting rolls, and a striker controlled by each of said gage rolls constructed and arranged to discharge a blank from the conveyor.

11. A blank sorting machine having, in combination, a series of thickness detectors each responsive to blanks of a different thickness, said detectors being independent of each other, continuously moving conveyor means for feeding blanks to the detectors, and means controlled by the detectors for suddenly snapping a blank off the conveyor, at a different place determined by the thickness of the blank, while the conveyor is in motion.

12. A blank sorting machine having, in combination, a continuously moving conveyor, and a series of combined thickness detecting and blank ejecting mechanisms, each mechanism being responsive to blanks of a different thickness to snap a blank suddenly off the conveyor, at a definite place determined by the thickness of the blank, while the conveyor is in motion, and all of said mechanisms being capable of concurrent operation, whereby a plurality of blanks of different thicknesses may be operated upon by said mechanisms at the same time.

13. In a machine of the class described, the combination of a series of spaced apart detectors, a corresponding series of spring operated, detector controlled, blank discharging devices located between the detectors, means for feeding blanks along said series, and blank discharging device resetting mechanism timed to operate a plurality of times while the feeding means feeds a blank from one detector to the next.

In testimony whereof I have signed my name to this specification.

ERASTUS E. WINKLEY.